United States Patent [19]

Carlsson

[11] 4,096,607
[45] Jun. 27, 1978

[54] SNAP FASTENING DEVICE

[76] Inventor: Gunilla A. Carlsson, Skidbacken 38, S-172 45 Sundbyberg, Sweden

[21] Appl. No.: 657,315

[22] Filed: Feb. 11, 1976

[30] Foreign Application Priority Data

Feb. 18, 1975 Sweden ............................ 7501797

[51] Int. Cl.² ............................................. A44G 13/00
[52] U.S. Cl. ............................ 24/230 AP; 24/241 PS
[58] Field of Search ............ 24/230 AU, 230 AP, 232, 24/241.5, 241.5 SP, 241.5 PS, 241.5 R, 240, 233, 231; 294/83, 84

[56] References Cited

U.S. PATENT DOCUMENTS

| 1,307,251 | 6/1919 | Gorman | 24/241 PS |
| 1,508,705 | 9/1924 | Mahan | 24/241 PS |
| 3,167,346 | 1/1965 | Miller | 24/232 |
| 3,405,966 | 10/1968 | Harley | 294/83 |
| 3,624,813 | 11/1971 | Gaylord | 24/230 AV |
| 3,911,671 | 10/1975 | Guillen | 294/83 R |

FOREIGN PATENT DOCUMENTS

| 629,103 | 11/1927 | France | 24/241 PS |
| 950,638 | 10/1949 | France | 24/241 PS |
| 256,058 | 2/1949 | Switzerland | 24/241 PS |

Primary Examiner—Bernard A. Gelak
Attorney, Agent, or Firm—Flynn & Frishauf

[57] ABSTRACT

A piston hank has an openable loop which is defined by a substantially U-shaped portion of a fastener body and part of a closure link which is pivotally connected to the fastener body. In a locked position, the closure link bridges the shanks of the U-shaped portion of the fastener body. The closure link comprises a spring actuated locking pin which is displaceable in a substantially straight groove and which, in the locking position, protrudes from an end of the closure link and which cooperates with a recess or hole formed in the fastener body. A release member is provided for displacing the locking pin into the closure link against spring action to a release position, in which release position the locking pin is disengaged from the recess or hole and the closure link can be swiveled open.

3 Claims, 2 Drawing Figures

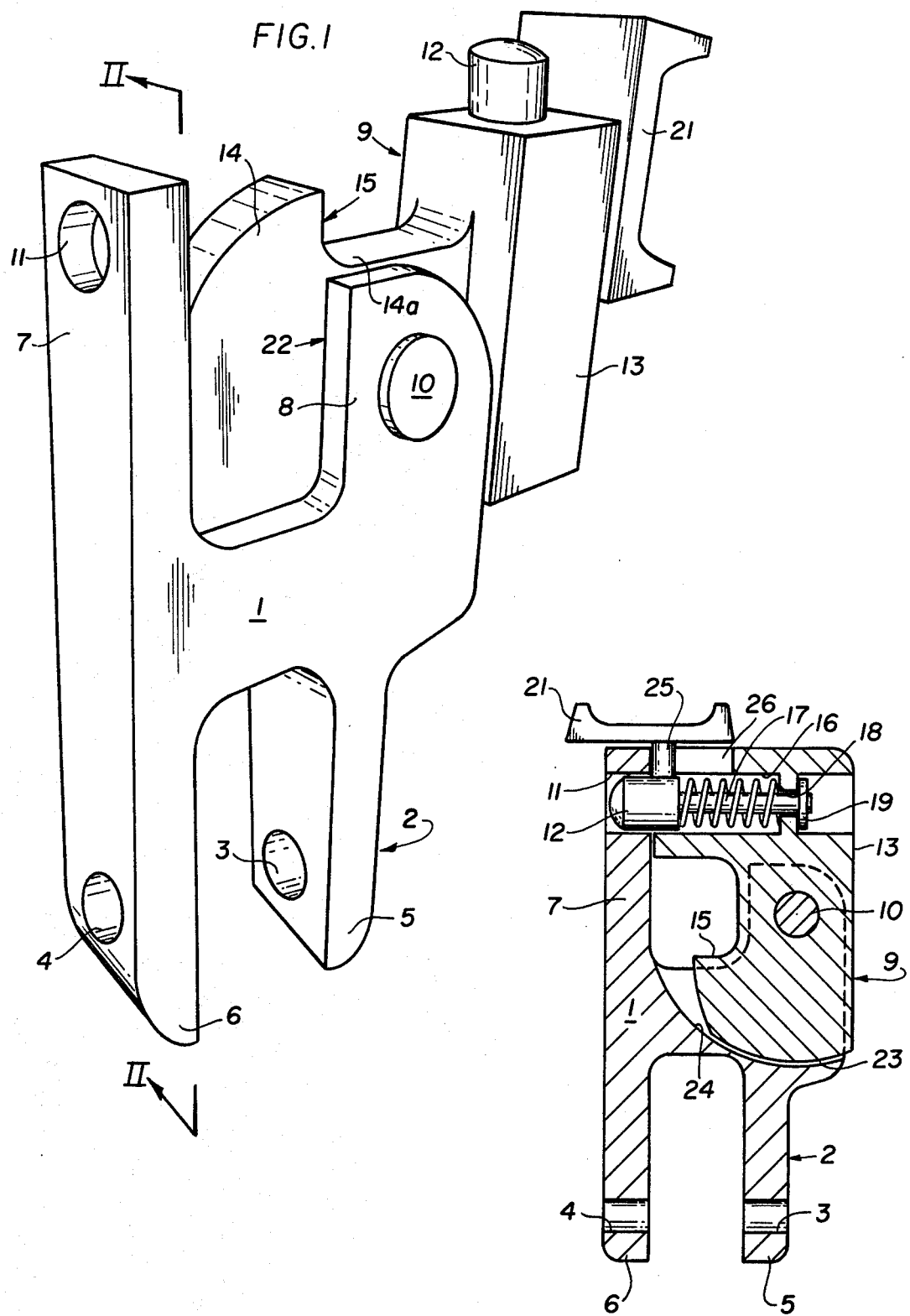

SNAP FASTENING DEVICE

The present invention relates to a snap fastening device, and more specifically to an improved piston hank.

Piston hanks to which the present invention pertains generally comprise a fastener body to be fixedly attached to the sail at one end and with an openable loop at the other end, the loop being restricted by at least part of the body and a closure link which in one end swivels around a shaft fixed to the fastener body and in the other end is provided with locking means to engage corresponding means in the fastener body.

Snap fastening devices of the abovementioned kind are usually known as snap shackles and are particularly used on yachts, specifically sailboats, for instance to attach sheets to the sheet clew of the sail, falls to fall clews and tacks to tack clews. The expression piston hank is mostly used for fastening devices which are attached to a wire or a rope and are displaceable along that wire. Thus, piston hanks are commonly used to attach the luff of the foresail to the forestay. Conventional piston hanks have, however, a principally quite different structure than that indicated above and are more correctly defined as snap fastening devices. A prior art jib snap is disclosed in U.S. Pat. No. 3,798,716 and it is quite obvious that the structure of this prior art fastening device is entirely different from that of the present invention, which in a way has more features in common with a conventional snap shackle. The reason that the old and commonly known design of a snap shackle has not been used for piston hanks is probably that the shackle so far has not been simple enough and rapid enough in handling to be used for attachment of a sail to a stay. Thus, a number of piston hanks or so-called "jib snaps" are provided on every foresail with each hank being fixedly secured to the luff of the sail at evenly spaced distances. Thus, every foresail can be provided with several dozens of piston hanks which must be rapidly attached to or released from the stay, for instance in changing sails.

The conventional piston hank is built so that a spring loaded pin is used to lock the forestay inside a loop formed by the main body of the hank. This design provides an acceptable safety function but the principal disadvantage with the use of these prior art hanks is that they require to hands to operate them, one to hold the main body of the hank and the other to operate the pin. This can impair the safety of the sailor, particularly when under way, since he has no hand left free to hold on to the boat. It also makes the operation of changing sails time consuming which is a detrimental factor in yacht racing.

The piston hank according to the present invention is consequently not based on this conventional design but has more in common with a conventional snap shackle, which consequently applies to the brief description given above. Conventional snap shackles are provided with a locking mechanism in the shackle body which is designed as a spring biased and throughgoing pin which can be brought into engagement with a recess or hole in the closure link. To release the closure link one has to use one hand to pull out the pin which for this purpose is provided with an eye, whereas the other hand exerts a counterforce for this tractive force. Thus, the disadvantage with the use of prior art snap shackles also is that they require two hands to attach and release the shackle, which involves certain dangerous moments, as indicated above.

The present invention relates to a design of a piston hank in which these drawbacks have been entirely eliminated since the hank can be easily and rapidly operated with one hand when it is attached as well as when it is released. This has been derived according to the invention without departing from the safety function which shackles of this kind must show to satisfy the high requirements at sea.

A further object of the present invention is to facilitate release of the closure link by a specific design which makes it possible to operate the locking mechanism by compressive force instead of tractive force as is the case in most conventional piston hanks.

SUMMARY OF THE INVENTION

These objects are realized according to the invention in a piston hank substantially characterized in that the openable loop is restricted by a substantially U-shaped portion of the fastener body and part of the closure link which in a locked position is arranged to bridge the shanks of the U-shaped portion, and that the closure link comprises a spring actuated locking pin which is displaceable in a substantially straight groove and which in the locking position protrudes from an end of the closure link thereby cooperating with a recess or hole formed in the fastener body, and that a release member upon actuation is arranged to displace the locking pin into the closure link against the spring action to a release position, in which release position the locking pin is disengaged from the recess or hole and the closure link can be swivelled open.

According to an embodiment of the invention a shaft is fixed to one of the shanks of the fastener body around which the closure link is pivotable. The other shank is thus provided with the recess or hole for the locking pin.

BRIEF DESCRIPTION OF THE DRAWINGS

FIG. 1, the bank being in the closed or locked position is a perspective view of a piston hank according to the invention, and FIG. 2 is a cross-sectional view through the shackle according to FIG. 1.

DETAILED DESCRIPTION

As appears from FIG. 1 a piston hank according to the invention comprises a fastener body 1 with an open hook forming a clevis 2 with two through holes 3,4 in the shanks 5 and 6. If the piston shank is used for instance on a foresail the luff of the sail is introduced between the shank and the hank is fastened by means of a screw which threads in one of the holes 3 or 4.

The hank is moreover designed with an openable loop which on one hand is restricted by a U-shaped portion of the fastener body with two shanks 7 and 8 and a closure link 9 pivotally mounted in the body on FIG. 1 shown in its outwardly swivelled position with the hank opened. The closure link 9 swivels around a shaft 10 attached to one shank 8 of the fastener body 1, whereas the other shank 7 is formed with a through hole 11 for receiving a locking pin 12 displaceably arranged in the closure link 9. The closure link 9 is moreover designed with two substantially perpendicularly connected portions, one of which 13 comprises a locking mechanism and the other 14 being designed as a bearing member for the closure link and being provided with a shoulder 15 thus arranged relative to the shaft 10 that the closure link 9 automatically swivels to a locked position when a capture surface formed by the shoulder 15 and an adjoining surface 14a of the other shank portion 14 is pressed against a forestay or the like.

In FIG. 2 the piston hank is shown in locked position in which the locking pin 12 is introduced into the through hole 11 in the shank 7 of the fastener body 1. As appears from FIG. 2 the locking pin 12 is displaceable in a groove 16 in one angular portion 13 of the closure link 9 and the displacement of the locking pin 12 is controlled by a spindle 17 which is introduced through a guide hole 18 with less diameter than the groove 16 and at one end being connected to the locking pin 12 and at the other end to a stop plate 19 which restricts the displacement of the locking pin 12 in the groove 16. A spring 20 urges the locking pin 12 towards a normal position in which the pin 12 protrudes from one end of the closure link 9, as appears from FIG. 1. In order to release the locking pin 12 from the hole 11 an actuation member 21 is pressed against the action of the spring 20 whereby the locking pin 12 is displaced into the groove 16 and the closure link 9 can swivel open around the shaft 10. The actuation member 21 is connected to the locking pin 12 by means of a cross head 25 which is displaceable in an aperture 26 in the front portion of the closure link 13.

In a suitable embodiment of the invention the bearing portion 14 of the closure link 9 is swivelling in a slot 22 formed in one shank portion 8 and in at least a part of the connecting portion between the shanks 7,8 of the fastener body. The slot 22 defines a pair of spaced apart ears. This arrangement guides the closure link 9 effectively between the ears of the slot 22 in the swivelling movement and in the locked position. To guide the closure link as well as possible the slot 22 is provided with an inner guiding surface 24 (FIG. 2) the form of which substantially coincides with a corresponding guiding surface 23 formed on the bearing member of the closure link 9.

The fastener body shown on FIGS. 1 and 2 can of course be given any shape suitable for the intended purpose and it can thus be designed as a closed loop or as a swivel shaft being rotatably retained in a corresponding hole in a spring fastener.

What I claim is:

1. A snap fastening device comprising:
    a fastener body (1) provided with locking means (11); and
    a closure link (9), one portion (14) of which is rotatably mounted in the fastener body (1) and another portion (13) of which is provided with locking means (12) adapted to engage said locking means (11) of said fastener body, said portions (13,14) being disposed substantially perpendicularly to each other;
    said fastener body (1) and said closure link (9) together defining an openable loop which is restricted by said fastener body and by said closure link;
    said fastener body (1) comprising a substantially U-shaped portion having a pair of shanks (7,8), and a connecting portion connecting said shanks, one of said shanks (8) and at least a portion of said connecting portion having a guiding slot (22) therein which defines a pair of spaced apart ears, a shaft (10) attached to said one shank (8) of said pair of shanks and passing through said slot and between said ears, said closure link (9) being journalled around said shaft (10) with said one portion (14) of said closure link (9) being at least partly in the portion of said slot in said connecting portion and between said ears when in the loop open as well as when in the loop closed position to permit swivelling movement of said closure link (9) about said shaft (10) through an angle of about 90°, said ears forming guiding or bearing surfaces for said one portion (14) of said closure link (9) when said closure link (9) is in the loop open as well as the loop closed position; and the other shank (7) of said pair of shanks having a through hole (11) therein forming said locking means of said fastener body (1), said substantially U-shaped portion cooperating with said closure link (9) to restrict said openable loop, and said closure link (9) comprising a portion which in the locked or loop closed position bridges the shanks of said U-shaped portion;
    said fastener body (1) having an external connection member (2) extending from said connecting portion in a direction opposite from said shanks (7,8); and
    said locking means of said closure link (9) comprising a substantially straight groove (16), a spring actuated locking pin (12) which is displaceable in said substantially straight groove (16) and which in the locking position protrudes from an edge of said closure link for cooperating with said hole (11) formed in said other shank (7) of said U-shaped portion of the fastener body (1) and a release member (21) including an actuation member provided with an actuation surface and protruding from said closure link (9), said release member (21) being coupled to said locking pin (12) for displacing said locking pin (12) into the closure link (9) against the spring action upon exertion of a direct acting compressive force on said actuation surface to a release position in which said locking pin (12) is disengaged from said hole (11) and said closure link (9) can be swivelled open by rotation thereof through an angle of about 90° relative to said fastener body (1).

2. A snap fastening device according to claim 1, wherein said one portion (14) of said closure link (9) comprises bearing means including a shoulder (15) defining a capture surface, said shoulder (15) being arranged relative to said shaft (10) such that when said closure link (9) is in the loop open position and said capture surface thereof is pressed against an object, the pressure on said capture surface causes said closure link (9) to be automatically rotated to the loop closed, locked position.

3. A snap fastening device according to claim 1, wherein said other shank (7) of said U-shaped portion of said fastener body (1) includes a surface adjacent said through hole (11) against which said locking pin (12) bears during closing of said closure link (9) for causing said locking pin to recede into said groove (16) during closure of said closure link (9), said locking pin (12) entering said through hole (11) when it is in registration therewith.

* * * * *

UNITED STATES PATENT AND TRADEMARK OFFICE
CERTIFICATE OF CORRECTION

PATENT NO. : 4,096,607
DATED : June 27, 1978
INVENTOR(S) : Gunilla A. CARLSSON

It is certified that error appears in the above-identified patent and that said Letters Patent are hereby corrected as shown below:

Column 2, delete lines 41-45 (Brief Description of the Drawings) and substitute therefor the following:

--Fig. 1 is a perspective view of a piston hank according to the invention in the open position, and Fig. 2 is a cross-sectional view through the shackle according to Fig. 1, the hank being in the closed or locked position.--.

Signed and Sealed this

Sixth Day of March 1979

[SEAL]

Attest:

RUTH C. MASON
*Attesting Officer*

DONALD W. BANNER
*Commissioner of Patents and Trademarks*